United States Patent Office 2,822,239
Patented Feb. 4, 1958

2,822,239

METHOD OF SEPARATING PLUTONIUM

Harrison S. Brown and Orville F. Hill, Oak Ridge, Tenn., assignors to the United States of America as represented by the United States Atomic Energy Commission No Drawing. Application July 31, 1944
Serial No. 547,520

7 Claims. (Cl. 23—14.5)

The present invention is directed to new methods of fluorination and is particularly concerned with fluorination processes involving the use of plutonium hexafluoride and/or the recovery of plutonium in concentrated form from compositions containing minute amounts of plutonium by a fluorination process. In accordance with the present invention it has been found that plutonium hexafluoride is a satisfactory fluorinating agent and may be reacted with various materials capable of forming fluorides. Thus metals and non-metals such as potassium, copper, brass, iron, zinc, mercury, sodium, aluminum, tin, lead, sulphur or silicon or similar material may be reacted with plutonium hexafluoride with consequent formation of a fluoride of the above listed materials and plutonium in a reduced form, generally in the form of a lower fluoride. The reaction may be conducted at an elevated temperature while the plutonium hexafluoride is in vapor state and is found to be particularly rapid when conducted at a temperature above approximately 100° C. but preferably not over about 450° C.

In accordance with a particularly effective modification of the present invention it has been found that the reactivity of plutonium hexafluoride with other fluoridizable materials is so great that the process may be used as a method of separating plutonium from mixtures containing plutonium hexafluoride and other vaporized fluorides even though the plutonium is present in but minute quantities. This process may be carried out by treating a mixture of fluoride vapors comprising plutonium hexafluoride and a higher fluoride of another metal such as uranium to selectively reduce the plutonium hexafluoride and thereby convert it to a less volatile fluoride, and recovering said less volatile fluoride from the vapor by condensation.

It is known that when natural uranium is subjected to neutron bombardment, the capture of neutrons by the $U^{238}$ isotope leads to the production of a new isotope $U^{239}$ which decays to form the transuranic element 93. On standing, this new element decays to form a small quantity of a second new element having an atomic number 94 known as plutonium (Pu). The isotope of Pu so produced has a mass of 239. During the neutron bombardment fission of the $U^{235}$ isotope present in natural uranium produces a number of highly radioactive fission products that make the mass extremely difficult to handle without exposure of personnel to gamma radiation. Neutron bombardment is discontinued before the concentration of $U^{239}$ and its products of decay becomes large since continued bombardment causes decomposition of the plutonium as rapidly as it is formed. Due to this fact plutonium is present in the bombarded uranium in small quantities usually of less than 0.5 percent by weight and frequently of the order of 1 gram per ton of uranium, the exact concentration depending on the density and length of neutron bombardment, and it is difficult to separate the plutonium from the uranium or even to form a uranium concentrate of high plutonium content.

It has been found, in accordance with the present invention, that, when uranium hexafluoride containing small quantities of plutonium hexafluoride is vaporized, the plutonium may be removed by selectively reducing the plutonium hexafluoride and collecting the less volatile reduced products. For example when such a vapor mixture is contacted with a fluoridizable metal surface, such as copper or other metal listed above, the plutonium is deposited on the cupriferous or other metallic surface, while the uranium hexafluoride is substantially unaffected and passes on to another point in the system. If the distillation temperature is chosen at 100 to 450° C., the fission products present in the uranium hexafluoride will remain behind in the still while the uranium hexafluoride is recovered as a final condensate at a point further along in the system. Thus, in one simple operation, separation of uranium, plutonium and fission products from each other is obtained.

The selective condensation of plutonium in accordance with the present invention will take place either in the presence of uranium hexafluoride vapors alone or with inert gas present. However, the preferred practice is to carry out the the condensation from a stream containing a small excess of fluorine gas.

The uranium-plutonium hexafluoride vapors may be secured from any convenient source of neutron irradiated uranium. For example, uranium metal or uranium oxide may be irradiated with neutrons for a substantial period of time and may be allowed to stand until the $U^{239}$ formed has finally decayed to element 94. Thereafter the oxide or metal may be converted to the tetrafluoride by reaction with hydrogen fluoride and finally vaporized as the hexafluoride by reaction with elemental fluorine. Alternatively uranium hexafluoride may be irradiated with neutrons and allowed to stand until element 94 has been produced, and the product may then be vaporized preferably in a stream of fluoride and treated as herein contemplated.

The conversion of the plutonium hexafluoride to a lower fluoride and the fluorination of the copper or other material may be effected in any convenient way, such as by passing the plutonium hexafluoride vapor over a copper or similar body or through a porous bed of such material. Where selective conversion of the plutonium is desired the vapors should be permitted to contact the metallic or other reducing agent at the reaction temperature for only a short period of time in order to minimize reduction of uranium hexafluoride and consequent contamination of the plutonium. During the process some uranium may be reduced but in any case the plutonium concentration of the reduced product is substantially higher than that of the original product.

The exact nature of the reaction is not known save that the plutonium is removed by deposition upon the fluoridizable metal and that the metal used is converted to a fluoride which may be a higher-valent, but usually is a lower-valent, fluoride, such as ferrous fluoride, cuprous fluoride, etc.

The reduced plutonium fluoride tends to condense upon the surface of the reducing agent and in such a case may be recovered simply by washing it from the surface of the reducing agent with a suitable solvent.

The following examples are illustrative.

EXAMPLE 1

A mixture of 0.03 microgram of plutonium and 100 micrograms of $UF_4$ was heated in a reactor containing fluorine at a pressure of about 30 pounds per square inch absolute pressure at a temperature of 500° C. The resultant gases were led through a copper tube provided with brass couplings and finally to a trap cooled with liquid nitrogen. During the operation the copper tube and brass couplings remained above 100° C. 100 percent of the uranium was collected as $UF_6$ in the liquid nitrogen-cooled trap. Over 70 percent of the plutonium collected on the brass and copper conduit. Since a similar separation is not secured when the copper tube is maintained below about 100° C. it is apparent that the plutonium removal is due to reduction of the plutonium hexafluoride by the copper and/or brass with consequent formation of the lower plutonium fluoride of higher vaporizing temperature and a fluoride of the metallic components of the tubing. Similar results may be secured with other metals.

EXAMPLE 2

Uranium tetrafluoride containing 0.0000005 percent by weight of Pu was placed in a fluorination still connected through a 2-inch long small-diameter copper tubing to a cold trap. The copper tubing was intermediate in temperature as to that of the still and that of the cold trap but was maintained above 100° C. Fluorine was introduced into the still to convert the tetrafluoride to the volatile hexafluoride which was then vaporized by heating the reactor to 425° C. whereby the vaporized fluorides passed through the system. Results are shown in the following table:

Table 1
COLLECTION OF PLUTONIUM FLUORIDE IN A SHORT COPPER TUBE USING FAST FLOW RATES

| Run No. | Flow in fluorine | | Time Pu spent in tube (secs.) | Percent Pu collected in tube | Percent Pu collected in cold trap |
| --- | --- | --- | --- | --- | --- |
| | (cc./min.) | (ft./sec.) | | | |
| 1 | 12 | 0.8 | .20 | 52 | 48 |
| 2 | 13 | 0.9 | .19 | 51 | 49 |
| 3 | 21 | 1.5 | .11 | 64 | 36 |
| 4 | 28 | 1.9 | .08 | 15 | 85 |

The data in the above table show clearly that the deposition of plutonium in the short length of copper tube is dependent upon the rate of flow through the system.

To further illustrate the remarkable preference exhibited by plutonium hexafluoride for depositing on warm cupriferous surfaces, a plutonium tetrafluoride uranium tetrafluoride mixture was fluorinated at 500° C. The product was distilled into a copper tube heated in a furnace. Inside the heated copper tube was a copper "finger" cooled internally with water. After the product was run through the apparatus, the latter was disassembled, and the various deposits were analyzed for plutonium. It was found that three to four times as much plutonium had collected on the hot walls of the tube as had collected on the surface of the cold "finger."

As can be seen from the above description, the present invention affords a simple and efficient means for separating extremely small quantities of plutonium from large quantities of uranium and fission products. In accordance with the present invention, when the proper temperature conditions of 100–450° C. are used, the fission products remain in the still, the plutonium collects in the cupriferous tube and the uranium collects in a final condenser. Thus, in one simple operation and without the addition of chemical reagents, fission products, uranium and plutonium are separated from one another.

The process of the above examples may be repeated using other metals. Furthermore the process may be varied by using metal wool or granular metal to form a porous bed and passing the vapors through the bed. Where the amount of plutonium subjected to treatment is minute it may be difficult to determine the form in which it collects on the copper, but in any event the plutonium so collected appears to exist in lower-valent states.

Although the present invention has been described with particular reference to the specific details of certain embodiments thereof, it is not intended that such details shall be regarded as limitations upon the scope of the invention except insofar as included in the accompanying claims.

We claim:

1. The process of separating plutonium from uranium that comprises converting the uranium and plutonium to uranium and plutonium hexafluorides, vaporizing the hexafluorides, and passing the vapor over a surface of copper metal maintained at a temperature between about 100° C. and 450° C.

2. A process of separating plutonium from uranium comprising fluorinating the uranium and plutonium to form hexafluorides, distilling said hexafluorides in the presence of an inert gas, and passing the vapors obtained over a surface of copper metal maintained at a temperature between about 100° C. and 450° C.

3. A process of separating plutonium from uranium comprising fluorinating the uranium and plutonium to form hexafluorides, distilling said hexafluorides in the presence of an inert gas, and passing the vapors obtained over a copper metal surface maintained at a temperature between about 100° C. and 450° C. to react plutonium hexafluoride with said surface and condense plutonium-containing reaction product, and then condensing the vapors of uranium hexafluoride separately.

4. The process of separating plutonium, uranium, and fission products resulting from the neutron bombardment of uranium that comprises fluorinating the mass of neutron-bombarded uranium to form fission product fluorides and hexafluorides of uranium and plutonium, vaporizing the plutonium and uranium hexafluorides from said fission product fluorides, and bringing the vapors obtained into contact with copper metal at 100° C. to 450° C. to react plutonium hexafluoride with said metal and condense plutonium-containing reaction product from the vapor-containing unreacted uranium hexafluoride.

5. The process of separating a mixture of plutonium, fission products, and uranium obtained by neutron bombardment of uranium that comprises fluorinating the mixture to obtain fluorides of fission products and hexafluorides of uranium and plutonium, vaporizing said hexafluorides thereby separating them from fission product values, bringing the vapor formed into contact with a surface of copper metal maintained at a temperature between about 100° C. and 450° C., and separately condensing the vapor remaining after said contact.

6. The process of separating small quantities of plutonium from uranium that comprises bringing a stream of plutonium and uranium hexafluorides in contact with hot metallic copper at 100° C. to 450° C.

7. A method of fluorinating copper which comprises the step of contacting said copper with plutonium hexafluoride at a temperature between 100° C. and 450° C.

References Cited in the file of this patent
UNITED STATES PATENTS
1,814,392     Low et al. _____ July 14, 1931
FOREIGN PATENTS
230,865     Great Britain _____ Dec. 10, 1925
OTHER REFERENCES Hyman et al.: Peaceful Uses of Atomic Energy (Geneva papers), vol. 9, pp. 613–626 (1955).